Dec. 5, 1944.   H. C. WOLD   2,364,334
NIBBLING MACHINE
Filed Nov. 1, 1943   2 Sheets-Sheet 1
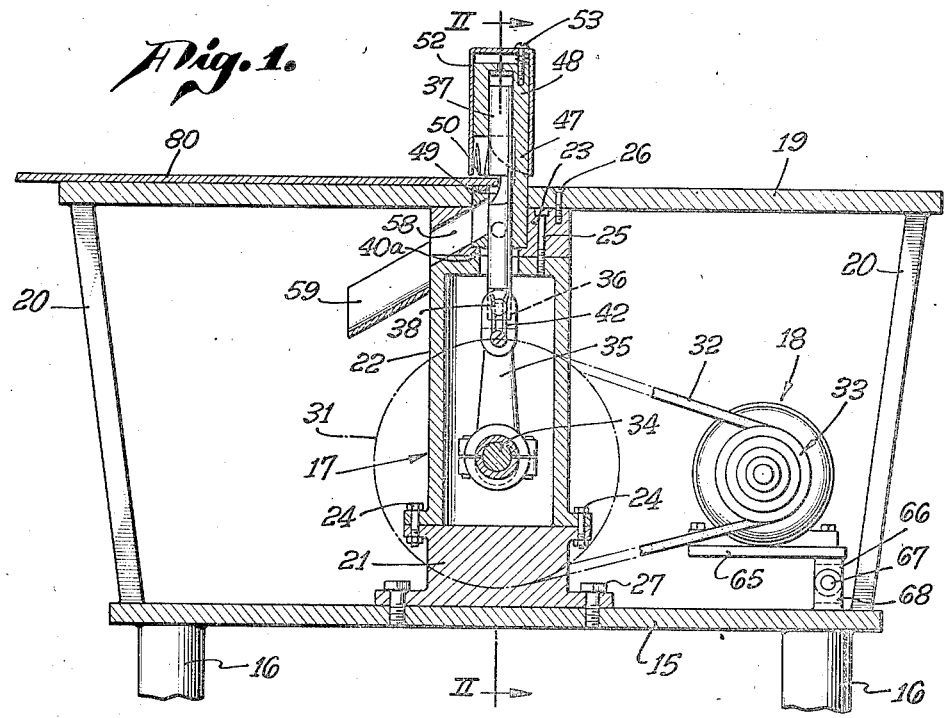
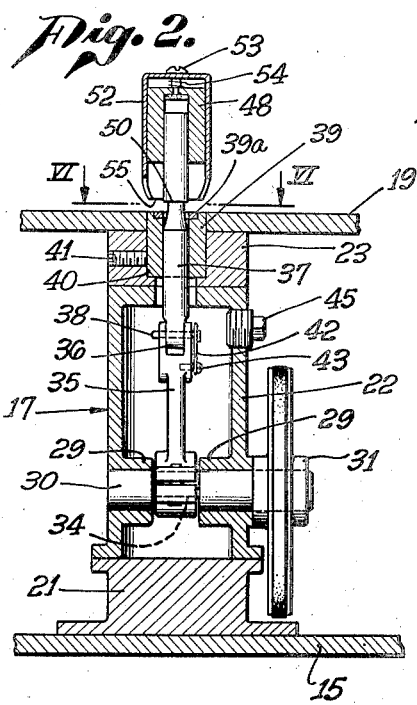
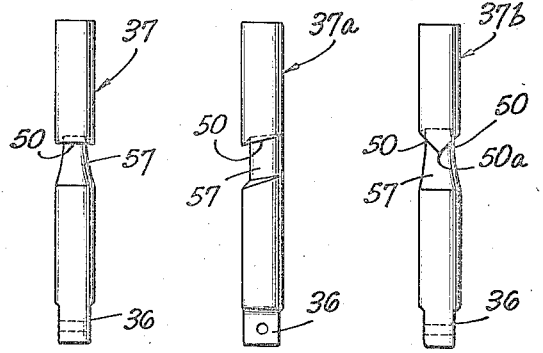
HARRY C. WOLD,
INVENTOR.
BY
ATTORNEY.

Dec. 5, 1944.  H. C. WOLD  2,364,334
NIBBLING MACHINE
Filed Nov. 1, 1943  2 Sheets-Sheet 2
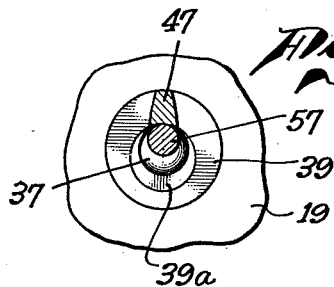
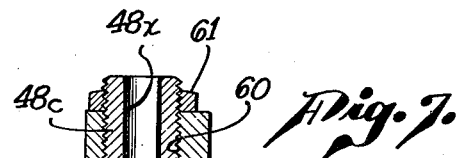
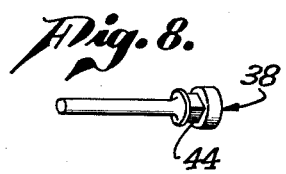
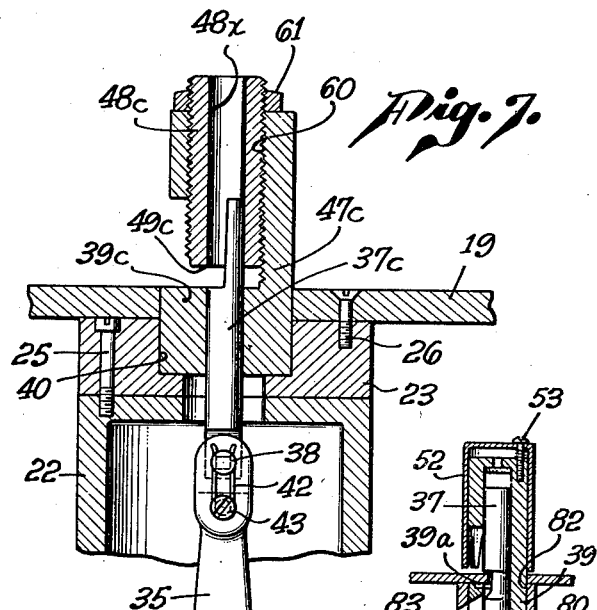
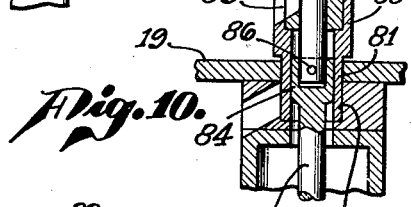
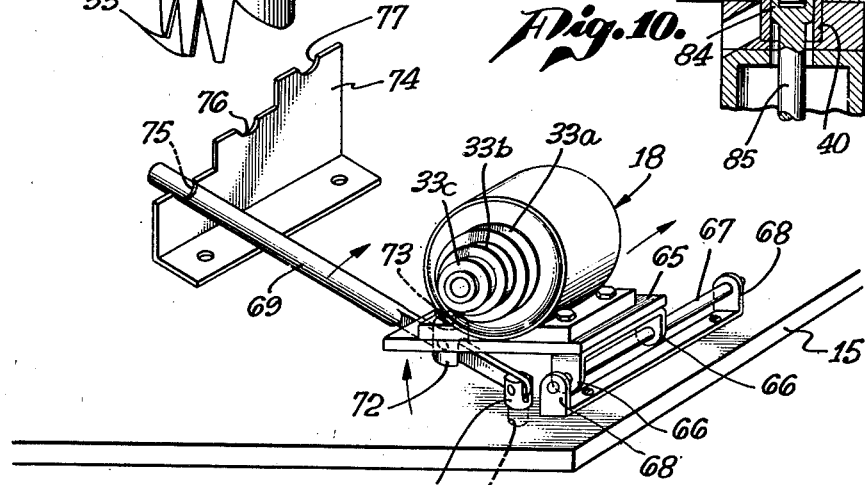
HARRY C. WOLD,
INVENTOR.
BY
ATTORNEY.

Patented Dec. 5, 1944

2,364,334

UNITED STATES PATENT OFFICE 2,364,334

NIBBLING MACHINE

Harry C. Wold, Los Angeles, Calif.

Application November 1, 1943, Serial No. 508,605

4 Claims. (Cl. 164—47)

This invention relates to devices for cutting sheet metal and more particularly to the type of machine having a pair of relatively reciprocal shearing members which make successive short cuts or bites in a sheet as the latter is fed through the machine.

Nibbling machines of the general type referred to have been in use for many years, but all such machines with which I am familiar have required a relatively large upper structure for supporting the upper shearing member, which upper structure had to be supported from the base by an arm or standard much the same as the head of a sewing machine is supported.

The distance of the supporting standard from the shearing elements limited the size of the sheet that could be handled, and in order to handle sheets of any substantial size, a relatively massive frame was required because the forces developed in shearing metal of any appreciable thickness are relatively great.

An object of the present invention is to provide a nibbling machine in which the usual supporting standard is eliminated and the upper shear member is supported from below so that there is no limit to the lateral dimensions of the sheet that is being cut.

Another object is to provide a nibbling machine in which the cutters or shears can be quickly and easily replaced or changed to adapt the machine for different types of work.

Another object is to provide a nibbling machine that is relatively simple and inexpensive.

Another object is to provide a particularly simple and effective apparatus for shifting a motor bearing a stepped pulley to automatically align the pulley on which the belt is mounted with the driven pulley and maintain the belt taut.

Other more specific objects and features of the invention will become apparent from the detailed description to follow which refers to the drawings.

Essentially, a nibbling machine in accordance with my invention comprises a flat table for supporting a sheet to be cut in combination with a vertically reciprocal cutting element in the form of a cylinder having a notch therein defining a shearing edge, which edge cooperates with a stationary cutting edge constituted by a guide in which the bar reciprocates, the guide having its upper shearing edge flush with the table top and the reciprocating bar projection through and above the table top.

The notch in the bar, in operation, cooperates with the upper edge of the stationary guide to cut out crescent-shaped chips from a sheet advanced past the bar across the table so that a slot, having a width equal to the diameter of the cutting bar, is cut in the sheet. That portion of the cutting bar projecting above the table top is connected to the lower end of the bar by a neck which is of smaller diameter than the full diameter of the bar so that the slot cut in the sheet is wider than the neck and the sheet can pass the neck. Furthermore, by making the neck appreciably smaller than the full diameter of the bar, the sheet can be turned as necessary to cut curved edges, when desired.

In its preferred embodiment, my machine includes a stationary upper guide for slidably supporting the upper end of the cutting bar, which guide is connected to the main guide support at the lower end of the reciprocating bar by a neck of width equal to or less than the width of the neck of the cutting bar, so that the neck of the guide, like the neck of the cutting bar, can pass through the slot cut in the sheet.

In the drawings:

Fig. 1 is a longitudinal vertical section through a machine in accordance with my invention;

Fig. 2 is a vertical section perpendicular to the section of Fig. 1 taken in the plane II—II of Fig. 1;

Figs. 3, 4 and 5 are front elevation views showing three different forms of reciprocal cutting elements that may be employed;

Fig. 6 is a detail horizontal section taken in the plane VI—VI of Fig. 2;

Fig. 7 is a detail section taken in the same plane as the section of Fig. 1 but showing a modified form of the invention in which the machine cuts on the up stroke instead of the down stroke;

Fig. 8 is a perspective view of the pin for interconnecting the reciprocating cutter to the connecting rod;

Fig. 9 is a perspective view of the guard and work hold-down member of the machine;

Fig. 10 is a longitudinal vertical section similar to Fig. 1 but illustrating an extension attachment which may be employed with my machine; and Fig. 11 is a skeleton view in perspective of a mechanism for shifting the drive motor to position it for use with different steps of the stepped driving pulley thereof.

Referring first to Figs. 1 and 2, there is shown a sub-base 15 which may be supported by legs 16 from the floor and which in turn supports the crank case 17 of the machine, an electric drive motor 18 and the work supporting table 19. The table 19 may be of substantially larger lateral dimensions than the base 15 and may be supported therefrom by four legs 20 which extend outwardly and upwardly from the four corners of the base 15. A work sheet 80 is shown resting on the table 19 in position to start a cut therein.

The crank case 17 is made in three parts 21, 22 and 23, for convenience in assembly, the parts 21 and 22 being joined together by bolts 24 extended through flanges on the parts. The upper part 23 is joined to the part 22 by screws 25 and the part 23 is also anchored to the table 19 by screws 26. Part 22 constitutes the crank case proper and part 21 constitutes a removable lower closure and supporting member therefor, the part 21 being secured to the base 15 by screws 27.

The crank case 17 is provided with a pair of main bearings 29 in its opposite walls for rotatably supporting a crank shaft 30 which, in the form of the invention illustrated herein, extends beyond one wall of the crank case and has secured thereto a driving pulley 31 which is connected by a belt 32 to the pulley 33 of the driving motor 18. The pulley 31 acts not only as a pulley, but also as a flywheel and if desired the opposite end of the crank shaft 30 may extend through the opposed wall of the crank case and a second flywheel may be provided thereon.

The crank case 30 has a throw 34 of reduced diameter which is engaged by the bearing on the lower end of a connecting rod 35, the bearing being of conventional split form for convenience in assembly and adjustment. The upper end of the connecting rod is forked to receive the flattened lower end 36 of the reciprocal cutting element 37 and is pivotally connected thereto by a pin 38. The cutting bar 37 reciprocates in a guide 39 which is received in a reduced opening 40 in the upper end of the crank case and rests upon a radially inwardly extending flange 40a where it may be secured in place by a set screw 41.

To facilitate insertion and removal of the reciprocal cutting elements 37, the pin 38 is releasably retained in place by a U-shaped spring clip 42 (Figs. 7 and 8), which clip is secured at its closed end to the connecting rod by a screw 43 and engages an annular groove 44 in the head of the pin 38. The spring clip 42 not only retains the pin in position, but prevents it from rotating in the connecting rod, by virtue of the fact that the bottom of the groove 44 is rectangular in cross section providing juxtaposed flat faces which are engaged by the spring 42.

To permit changing the reciprocal cutting elements 37 without disassembling the crank case, a hole is provided in the side wall of the casing, which hole is normally closed by a screw plug 45 (Fig. 2). When this plug 45 is removed, the head of the pin 38 can be grasped with a pair of pliers and removed or inserted, the spring retainer 42 spreading during the removal or replacement to leave or enter the groove 44. The plug 45 prevents the entry of dirt into the crank case and also prevents oil from being splashed out, it being understood that the bottom of the crank case is oil-tight and is normally filled with oil up to the plug 45 so that the lower end of the cutting elements 37 dip during each revolution of the crank shaft.

The reciprocal cutter element 37 is guided immediately below the level of the table 19 and also above the level of the table. Thus, the guide 39 does not extend above the level of the table top but it is connected by a neck member 47 to an upper guide portion 48 which receives the upper end of the cutter rod 37 and slidably supports it for vertical motion only.

As previously indicated, the upper front edge of the guide 39 indicated at 49 in Fig. 1 constitutes the stationary shear member which supports the workpiece 80 opposite the cutting edge 50 of the reciprocating cutter so that as the work is pressed against the cutter, the latter bites out crescent-shaped chips from the metal in its path.

To form a guard and to also hold down the sheet against the table, a cap 52 is fitted with a sliding fit on the upper guide member 48, this cap being retained in position by a screw 53 extended through the top of the cap and threaded into the guide 48. A helical spring 54 surrounds the screw 53 and is compressed between the top of the guide and the top of the cap to maintain the cap against the head of the screw. Therefore, by simply turning the screw 53 in or out, the cap 52 can be raised or lowered to bring the lower edges 55 thereof against the sheet immediately in front of the cutter.

As shown in Figs. 3, 4 and 5, the reciprocating cutter element 37 may have a variety of shapes. The cutter 37 shown in Fig. 3 has a cutting edge 50 that extends straight across. Such a cutter makes a clean cut and has no tendency to shift the sheet laterally, but it is noisy in operation because of the simultaneous impact of all portions of the cutting edge against the sheet.

The cutting element 37a shown in Fig. 4 differs from the cutter 37 in that its cutting edge 50 lies in a plane at an oblique angle from front to back to the longitudinal axis of the cutter. This arrangement provides a shear cut and is quieter in operation than the cutter of Fig. 3.

The cutter 37b shown in Fig. 5 has two cutting edges 50 which each lie in a plane oblique to the longitudinal axis of the cutter, but both edges converge to a common point 50a. Such a cutter has the advantages of providing a shear cut and also being bi-laterally symmetrical so that there is no tendency to shift the work to one side or the other. However, it is more difficult and expensive to make than the cutters of Figs. 3 and 4.

It will be observed from the construction described that the cutting edge is forced against the work by a pull applied to the lower end of the cutter element so that the cutter must withstand substantial tensile forces. To this end it is preferably made of some inherently tough material, such as tool steel which, if desired, may be locally hardened at the cutting edge.

Also, that part of the upper face of the guide 39 against which the shearing forces are directed may be provided with an inset 39a of hard material, thus permitting the major portion of the guide member 39 to be constructed of relatively inexpensive material without sacrifice of hardness of the shearing surface of the guide.

As is apparent from the elevation views of Figs. 3, 4 and 5 and from the sectional view of Fig. 6, the width of the throat 57 of the reciprocal cutter is substantially less than the full diameter of the cutting portion so that the slot cut in a sheet passed through the machine is substantially wider than the throat portion 57 of the cutter which the sheet must pass. Furthermore, the neck portion 47 (Fig. 6) is preferably made even narrower than the throat 57 of the reciprocating cutter so that reasonably sharp turns can be made to cut curved edges as well as straight edges.

Each time the cutter bites a chip out of the work, the chip is carried into the lower guide 39, and to permit discharge of the chips an inclined aperture 58 is provided in the front wall of the lower guide 39 and the adjacent portion of the crank case. The notch in the reciprocating cutter 37 immediately below the cutting edge 50 moves into position juxtaposed to this passage 58 as the cutter reaches the lowest part of its stroke, so that the chip that was cut drops out through the aperture 58. A chute 59 may be provided on the front of the crank case immediately below the orifice or aperture 58 to guide the chips into a suitable receptacle that can be placed on the sub-base 15.

A variation of the construction described is shown in Fig. 7. The principal difference between this construction and that of Fig. 1 is that the cutting edge on the reciprocating cutter 37c is reversed so that it cuts on the up stroke instead of the down stroke, and an adjustable stationary shearing member is mounted above the table.

Thus, in Fig. 7, the lower guide member 39c has no cutting edge but the upper guide member 48c has a cutting edge 49c thereon. The upper guide member 48c is preferably formed as a piece separate from the guide member 39c and mounted thereon for adjustment up and down relative to the upper surface of the work supporting table 19. In the form illustrated in Fig. 7, the upper guide member 48c is formed as a tubular member threaded upon its exterior surface to be threadedly received in a bore 60 extending vertically from the upper end of an extension of the guide member 39c. That part of the guide member 39c which interconnects the upwardly extending extension and the lower guide portion thereof is preferably formed as a neck 47c similar to the neck 47 described with reference to the form of the invention illustrated in Figs. 1 through 6.

The sleeve constituting the upper guide member 48c may be constructed of suitable hard material having a longitudinal bore 48x extending therethrough of a diameter equal to the diameter of the reciprocating cutter 37c so that as the reciprocating cutter moves upwardly, it will shear a cut from a piece of material disposed upon the work table between the table surface and the lower shearing edge 49c of the guide 48c, the chips so cut being pushed progressively upwardly through the bore 48x and out of the open end thereof. Since the chips fit the bore 48x with a tight push fit, they remain at their uppermost position during the down stroke of the cutter 37c, the taper shown on the upper portion of the cutter 37c serving to disengage the cutter from the chip at the beginning of the down stroke.

By rotating the guide 48c relative to the guide member 39c, the lower shearing edge may be disposed at different distances above the table top to thus accommodate different thicknesses of material to be cut thereby, the guide 48c being locked in any adjusted position by means of a lock nut 61.

To adapt my machine to cut sheet material having shapes other than that of a flat sheet, for example pieces in which the sheet material has been formed into desired shapes such that the line of the cut will not rest upon the table top, I provide an extension attachment as illustrated in Fig. 10 which may be readily inserted to provide a work supporting surface disposed well above the table top. The extension attachment comprises a sleeve 80, the lower end 81 of which is formed with an outside diameter equal to the outside diameter of the guide member 39 so that it may be inserted in the guide receiving opening 40 in place of the guide 39. The upper end of the sleeve 80 is provided with a longitudinally extending bore 82 adapted to receive and hold the guide 39 in spaced relation to the upper surface of the table top, the front wall of the sleeve 80 being provided with a chip passage 83 adapted to align with the chip passage in the guide 39.

The lower end of the reciprocating cutter 37 is received within a socket 84 formed in the upper end of a cutter extension member 85 where it may be retained in place by means of a short pin 86, the lower end of the cutter extension 85 being formed with a flattened surface to be received between the bifurcated arms of the connecting rod 35 in the same manner as the cutter 37 is secured to the connecting rod.

With the extension assembly 80 and 85 in place, the upper surface of the extension sleeve 80 will form a work supporting surface of relatively small area upon which a bent or formed workpiece may rest as the cutter elements 37 and 39 nibble off the material of the workpiece.

It is often desirable to run a nibbling machine of the type described at different speeds on different types of work. Hence, the motor 18 is provided with a stepped pulley 33 which gives the necessary range of speeds. However, when the belt is shifted to different steps of the pulley 33, the motor must also be shifted, both laterally and longitudinally, in order to maintain the belt in alignment with the pulley 31 and maintain it taut.

To this end I mount the motor 18 on a base 65 (Figs. 1 and 10) having downwardly extending arms 66 which are slidable longitudinally on a rod 67 and are also rotatable about the rod. The latter may be supported at its opposite ends in standards 68 extending upwardly from the base 15. The motor is shifted both longitudinally and rotatably with respect to the shaft 67 by a control lever 69 which is fulcrumed at its rear end in the head of a pin 70, which pin is rotatable in an aperture 71 provided therefor in the base 15. Intermediate the ends, the lever 69 slidably supports a block 72 having a pin 73 in its upper end which engages an aperture in the motor base 65.

There is mounted on the base 15 a rest member 74 having three notches 75, 76 and 77, each of which is adapted to support the forward end of the lever 69. As the notches are progressively higher from right to left (when looking at the front of the machine), the motor is swung upwardly and longitudinally along the rod 67 as the front end of the lever is moved from notch 75 to notch 76, and from notch 76 to notch 77. When the lever is in notch 75 as shown, the motor is positioned to align the largest step 33a of the motor pulley with the nibbler pulley, and the height of the notch 75 is such that the belt is taut when engaged with the step 33a. When the lever is moved into the notch 76, the motor is swung to bring the second step 33b of the pulley into alignment with the nibbler pulley, and simultaneously the motor is rocked about the shaft 67 to maintain the belt taut, despite the smaller diameter of the step 33b. Similarly, when the lever 69 is placed in the notch 77, the motor is positioned to align the smallest step 33c of the pulley with the nibbler pulley and maintain the belt taut.

In the cutters previously described with reference to Figs. 3, 4 and 5, the neck 57 is rearwardly displaced from the center of the cutter rod. As an alternative construction, the cutter rod might be recessed all the way around so as to have a circumferentially continuous cutting edge. Such a cutter would function substantially the same as the cutter of Fig. 3 and it would have the additional advantage that when one-half of the edge becomes dull, the cutter can be turned half way around and the other half of the cutting edge employed, thereby doubling the effective life of the cutter.

It will be evident that the nibbler described involves no super-structure above the sheet supporting table other than that immediately adjacent the cutter and that there is no standard displaced from the cutter and defining a throat which would limit the size of the sheet that could be cut. Furthermore, by extending the cutter through the table and reciprocating it from the lower end, a great deal of mechanism is eliminated.

My construction is particularly useful in cutting or trimming openings in a sheet that do not communicate with the edge of the sheet, since it is merely necessary to make an initial hole in the sheet large enough to pass down over the cap 52.

Although for the purpose of explaining the invention some particular modifications thereof have been described in detail, numerous variations from the exact construction will be obvious to those skilled in the art, and the invention is, therefore, to be limited only to the extent set forth in the appended claims.

I claim:

1. A machine of the type described comprising: an elongated reciprocal shearing member and a stationary shearing member, said members having cooperating shearing edges shaped to cut distinct chips out of a work sheet interposed therebetween, whereby repeated movement of the sheet past said members cuts a kerf therein of substantial width; drive means connected to one end of said reciprocal member for reciprocating it through a stroke greater than the thickness of said sheet; a pair of guide members slidably receiving and guiding the two ends of said reciprocal member on opposite sides of its shearing edge; frame means for directly supporting the guide member on that end of said reciprocal member to which said drive means is connected; and a neck member interconnecting said guide members and extending along side said reciprocal member and having a width less than the width of said kerf, said reciprocal member comprising a bar having a notch therein intermediate its ends, said notch dividing the bar into opposite end portions of uniform cross sectional size slidable in said respective guide members, and one edge of said notch constituting said shearing edge, the cutting edge of said notch comprising two sections converging to a point, said reciprocal member being bi-laterally symmetrical with respect to an axial plane passing through said point.

2. A machine of the type described comprising: a crank case; a crank shaft journaled in said crank case and having a throw within said case; a connecting rod journaled at its lower end on said throw; a stationary guide sleeve and shearing member in the upper end of said crank case; a vertically reciprocal shearing member slidable in said guide sleeve and having an eye at its lower end adapted to be juxtaposed to an eye in the upper end of said connecting rod; a connecting pin insertable through said eyes in said shearing member and connecting rod for pivotally interconnecting them; spring means for releasably engaging said pin and retaining it in engagement with said connecting rod and said reciprocal shearing member, said crank case having an opening in one side thereof juxtaposed to the eyes in said connecting rod and reciprocal shearing member through which said pin may be inserted or removed, and means for closing said opening.

3. A machine of the type described comprising: a stationary tubular member having an inner guiding surface and an end shoulder defining, with the inner surface, a shearing edge; an elongated bar guided by and reciprocal in said tubular member and projecting therefrom, said bar having a notch, one edge of which constitutes a shearing edge reciprocal past the shearing edge of said tubular member in shearing relation therewith; and reciprocating drive means connected to the end of said bar on the opposite side of said notch from said shearing edge, whereby the shearing force transmitted through said bar from said driving means to said shearing edge places the bar in tension, said stationary tubular member having a lateral recess extending therethrough adjacent the shearing edge thereof and sufficiently close thereto to communicate with the notch in said bar at the end of the cutting stroke of the latter for discharge of chips from said notch.

4. A machine of the type described comprising: a stationary shearing member consisting of an elongated body having a longitudinal passage extending therein from one end and a lateral notch communicating with said passage for entry of a work sheet, one wall of said notch constituting a work-supporting face and defining with said passage a shearing edge; a shearing member reciprocal in said passage and having a notch therein, one edge of which constitutes a shearing edge reciprocal past the shearing edge of said stationary member; means connected to the exterior end of said reciprocal shearing member for reciprocating it; a cap slidably fitted on the other end of said body and having an inner edge defining, with said work-supporting face, a mouth for supporting a work sheet; and means for adjustably supporting said cap on said body to adjust the size of said mouth for work sheets of different thickness.

HARRY C. WOLD.